United States Patent [19]

Yoshii

[11] Patent Number: 4,519,521
[45] Date of Patent: May 28, 1985

[54] TAPE CASSETTE
[75] Inventor: Tetsuji Yoshii, Neyagawa, Japan
[73] Assignee: Matsushita Electric Industrial Co., Ltd., Kadoma, Japan
[21] Appl. No.: 646,212
[22] Filed: Aug. 31, 1984
[30] Foreign Application Priority Data Sep. 6, 1983 [JP] Japan .................. 58-164452
Oct. 13, 1983 [JP] Japan .................. 58-191165
Nov. 10, 1983 [JP] Japan .................. 58-211329
Dec. 9, 1983 [JP] Japan .................. 58-233057
Apr. 24, 1984 [JP] Japan .................. 59-82167
Apr. 24, 1984 [JP] Japan .................. 59-82168

[51] Int. Cl.³ .......................................... B65D 85/672
[52] U.S. Cl. ................... 220/335; 206/387; 242/198
[58] Field of Search ............ 220/335; 206/387; 242/198, 199, 200

[56] References Cited

U.S. PATENT DOCUMENTS 4,180,220 12/1979 Shiba et al. .................. 242/199 X
4,422,599 12/1983 Okamura et al. .............. 242/198
4,466,583 8/1984 Giannis et al. ................ 242/198

Primary Examiner—Steven M. Pollard
Attorney, Agent, or Firm—Wenderoth, Lind & Ponack

[57] ABSTRACT

This invention provides a tape cassette with a cover movable for opening-closing provided in front of cassette halves, which is suitable particularly as an audio tape cassette. The tape cassette of this invention has a cover which makes opening-closing of the front opening part of the cassette body by its turning up- or downward, and an engaging holes with which the rotary shafts provided on the cover freely engage being provided in the sides of the aforementioned cassette body, said engaging hole having two sides tapering toward rear of the cassette body, and includes a means for urging the aforementioned rotary shafts of the cover to the rear of the cassette body. This structure permits opening of the front opening part of the tape cassette by turning the cover, whether the tape cassette is inserted in a cassette recorder with its front face (face A) or back face (face B) turned upward.

21 Claims, 32 Drawing Figures

TAPE CASSETTE

SUMMARY OF THE INVENTION

The present invention relates to an improvement of tape cassettes and particularly pertains to a proposal for a tape cassette with a cover for proofing against dust and finger-printing, etc.

Of late, magnetic recording by use of the tape cassette tends to have higher performance and higher recording density and to keep the tape clear from sticking dirt, dust or finger-prints, the need for providing the tape cassette with a cover has increased. Providing the tape cassette with a cover has already been practiced in video cassettes, but they have a structure peculiar to video cassettes such that they are mainly adapted for use on one side only or that their sizes with their covers being opened are large. They are not utilizable as audio tape cassettes as they are. As audio cassettes, it is desired that their dimensions with their covers shifted off are small, that their structures are so simple as to be realizable at low cost and that both faces A and B are usable.

The present invention, intended to meet the aforementioned demands, has as its object providing tape cassettes of very simple structure and which permit use of both faces A and B.

Further object of this invention is to prevent the cover from being mistakenly opened while being handled by means of a simple closed position locking mechanism. Since the cover is designed to be shifted with a click to the two positions, opened and closed, by means of a spring force and itself to be ensconsed after the operation, positioning and holding in the specified place for playing may be ensured similarly as in the case of conventional compact cassettes. On the cover, a spring force always urging it backward is applied while it is making the opening-closing operation, so that it moves between the two positions opened and closed with a minimum of locus. For this reason, the necessary space indide the tape recorder is minimized for effective miniaturization of equipments such as tape recorders, etc. Further, if leaf spring are used as the means for urging the cover backward and are composed to be pushed from the front of the rotary shaft, the springs may be held insdide a narrow space and because no coil spring is used, assibling work is facilitated and the internal space of the tape cassette may be effectively utilized.

These and other objects of this invention and details of embodiments thereof will be understood from the brief description on drawings and the detailed description set forth hereunder:

DETAILED DESCRIPTION OF THE INVENTION

Figure 1:
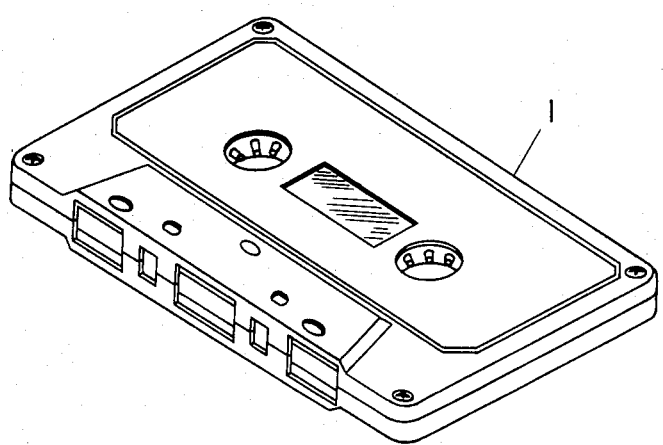
FIG. 1 is a perspective view of a conventional audio tape cassette.

FIG. 1 shows a perspective view of an embodiment of a conventional audio tape cassette (the so-called compact cassette) in which the tape is seen in the interior of the opening, a state of the tape being nearly exposed to dust, etc.

Figure 2:
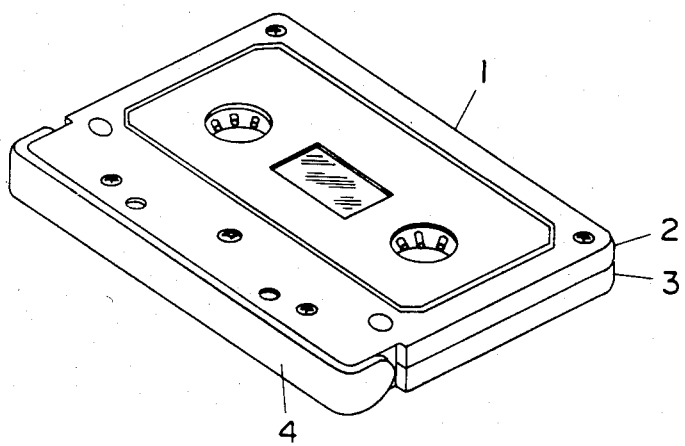
FIG. 2 is a perspective view of the tape cassette embodying this invention, showing its closed state.
Figure 3:
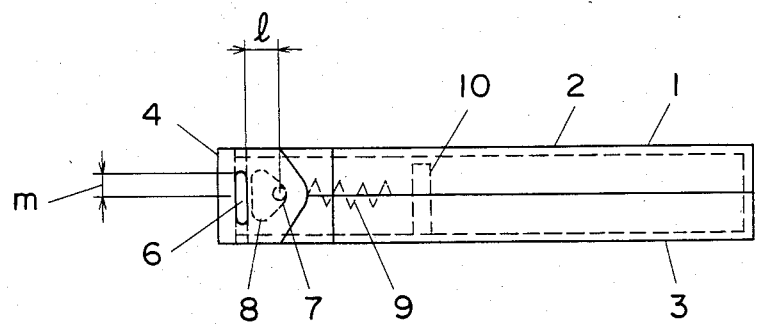
FIG. 3 is a side view of the tape cassette embodying this invention showing its closed state.

FIG. 2 is a perspective view showing the closed state of the tape cassette in an embodiment of this invention; FIG. 3 represents its side view; and FIG. 4, a side view showing its opened state. In FIGS. 2, 3 and 4, 1 denotes a cassette body; 2, the cassette upper half; and 3, the cassette lower half.

Numeral 4 designates a cover; 5, the side part of the cover 4; 6, a protuberance provided on the side part 5 of the cover; 7, a rotary shaft projecting inward of the side 5 of the cover; 8, a hole engaging with the rotary shaft 7, which is formed in the shape of a triangle which is tapering rearward to a position where the cassette upper half 2 and the cassette lower half 3 abut on each other. Numeral 9 stands for a spring one end of which is hooked on the rotary shaft 7 always to urge the cover 4, backward. Numeral 10 is designates a pin for hooking the spring which is integrally formed with the cassette lower half 3; and 11 openings at the front of the cassette.

Figure 5:
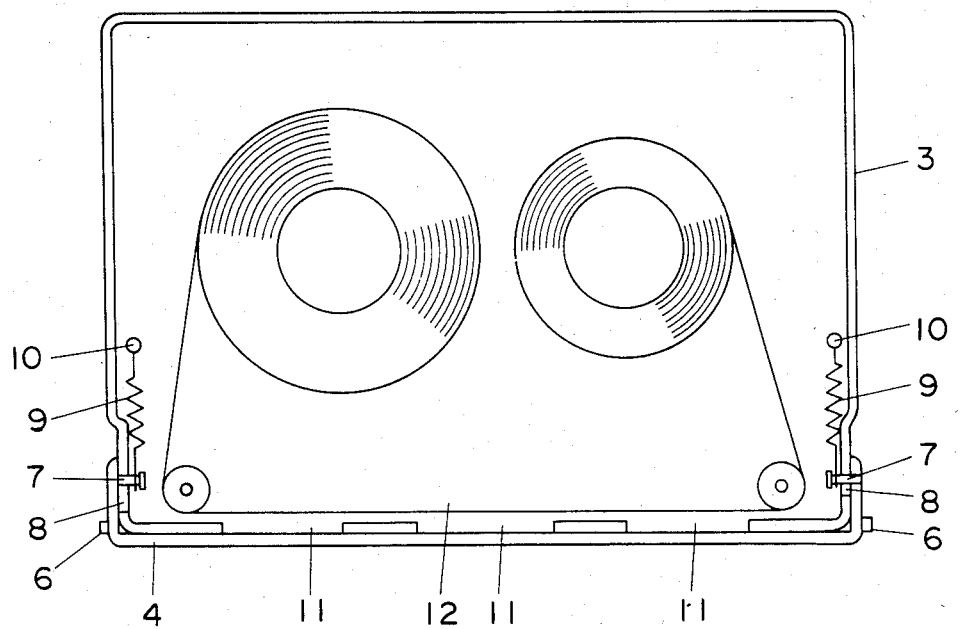
FIG. 5 is a top view of this tape cassette showing its interior.
Figure 6:
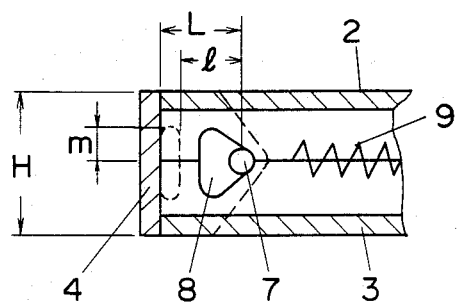
FIG. 6 is a side sectional view showing details of the essential part of the cover.
Figure 7:
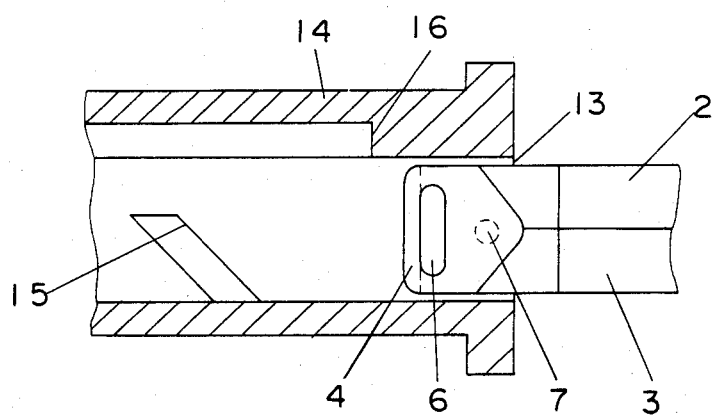
FIG. 7 is a side sectional view showing the essential part of an embodiment of the cassette recorder using this tape cassette which permits automatic opening and closing of the cover to be done interlocked with putting-in and -out of the tape cassette.

FIG. 5 is a top view showing the interior of the cassette in which a reel-to-reel tape is housed. FIG. 6 is a side sectional view showing details of the essential part of the cover, H representing the total thickness of the front part of the cassette; and L, the distance from the inside surface of the cover 4 to the rotary shaft 7. FIG. 7 is a side sectional view showing the essential part of an embodiment of a cassette recorder so designed that the opening-closing of the cover of this cassette, when used, may be automatically done interlocked with its putting-in and -out of the cassette recorder, 13 representing cassette inserting hole, 14 cassette insertion guide, 15 a projection having a bevel for opening the cover, which is provided on the side of the insertion guide, and 16 a part to be engaged for closing the cover being in its opened state when delivering the cassette.

Figure 4:
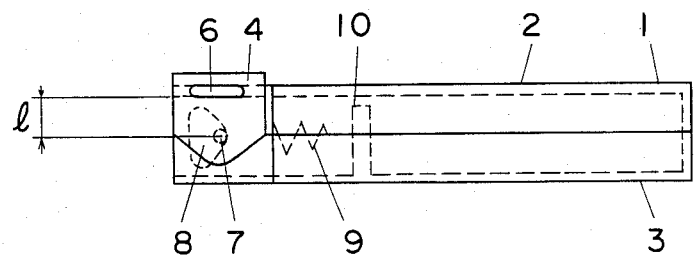
FIG. 4 is a side view showing its opened state.

The operation of the cassette of this embodiment composed as hereabove stated is described hereunder. In order to open the cover of the cassette being in the closed state as in FIG. 3, it is only proper to push up the front bottom edge. The cover 4, being urged by a spring 9 to the rearward, is raised along the front of the opening of the cassette and as it rises above about half the width of the cassette, it is turned while sliding with the front edge top of the opening part as the pivot, to be close-fitted on the upper surface of the cassette. When closing, the cassette cover 4 in the state of FIG. 4 is moved forward along the top surface of the cassette upper half 2. Then it will close the opening by making the reverse motion to the former one, to be in the state of FIG. 3.

The cover can also be opened downward. Thus if the cassette is turned over in actual equipment, the cover 4 is always opened upward from the equipment. The opening-closing operations may be automatically performed interlocked to the putting-in and -out of the cassette by utilizing a cassette insertion guide as shown in FIG. 7. Thus by means of the inclined projection 15 provided on the side of the insertion guide 14, the bottom end of the bump 6 provided on the side of the cover is pushed up, causing the cover to be opened. When delivering the cassette out of the equipment, the rear portion of the cover 4 in its opened state collides with an engaging portion 16 of the guide 14, causing the cover to be closed. If the total thickness H of the front of the opening part and the distance L from the cover inside surface to the rotary shaft 7 are approximately related by $L = \frac{1}{2} H$, the cover 4 itself may be ensconsed, being perfectly close-fitted on the upper or lower surface of the cassette.

The right-most end of the engaging hole 8 should be placed at the center of the cassette thickness so that the rotary shaft 7 is always brought to the center of the cassette thickness and, moreover, only a little clearance should be provided to allow close-fitting of the cover 4 on the opening under the closed state.

When closing the cover in the opened state by making use of the bump for making the opening-closing of the cover, it is necessary to permit insertion of the cassette in the closed state and provide on the side surface of the cassette inserting path the abutting body which collides with the protuberance for making the opening-closing of the cover when delivering out the cassette. Therefore, when the protuberance 6 for making the opening-closing of the cover is chosen to be as shown in the figure, the distance l of the protuberance 6 form the rotary shaft 7 and its height m from the center should be related by $l \geq m$ (FIG. 6).

Figure 8:
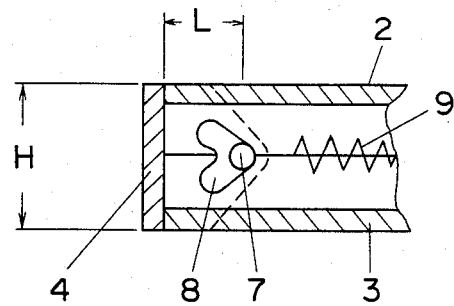
FIG. 8 is a side sectional view of a second embodiment of this invention showing its essential part.

FIG. 8 is a side sectional view showing the essential part of a second embodiment of this invention, in which the engaging hole is in the shape of approximately V which is tapering rearward. By adopting this configuration, the moving locus of the rotary shaft of the cover 4 may be limited to a minimum.

Although it is ideal to set the forwardly opened angle to be 45° both in the up- and down-ward directions, whichever the shape of the engaging hole, triangular or V-shape, varied movements required of the cover may be met by altering its length, even if the angle is a little changed.

The aforementioned embodiment concerns a cassette whose cover permits opening either upwardly or downwardly, but this arrangement may be applicable to a cassette whose cover is opened only in one direction, for which the engaging hole may have nearly the half size configuration.

Figure 9:
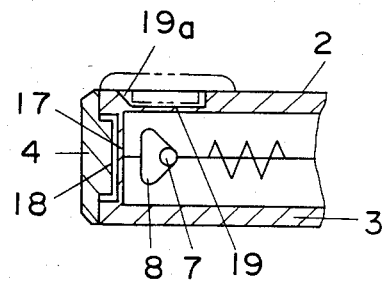
FIG. 9 is a side sectional view of a third embodiment of this invention.

FIG. 9 is a side sectional view showing the essential part of a third embodiment of this invention. It is provided with a locking mechanism which prevents easy opening of the cover in its closed state while being handled. FIG. 9 shows the cover being in the closed state, while the figure by two dots and a dash alternating lines represent its opened state. Numeral 17 designates a recess provided on the opening; 18, a protrusion; and 19, recesses provided on the upper and the lower surfaces of the cassette, with a tapered surface 19a formed at the forward portion, in which the protrusion of the cover being in its opened state enters. In making the opening-closing of the cover, it is necessary first to pull the cover 4 apart from the opening surface nearly perpendicularly thereto, thereby disengaging the recess 17 on the opening surface and the protrusion 18 on the inside surface of the cover from each other. Thereafter, the lower portion of the cover 4 is pushed upward to open the cover.

It is also permissible that the recess 19 is omitted and the protrusion 18 is to be put on the upper or the lower surface of the cassette body 1. In this way, the configuration and size are a little larger, but the upper and the lower edges of the cover are more readily utilizable as the abutting portions, as the cover is brought from its opened state to its closed state.

In the aforementioned embodiment, the recess 17 to engage with the protrusion 18 of the cover 4 is provided on each partition frame formed between openings at the opening surface. But the opening part itself may be used as the recess. Or the recess to engage with the whole of the inside surface of the cover 4 may be formed all over the front of the opening surface.

Figure 10:
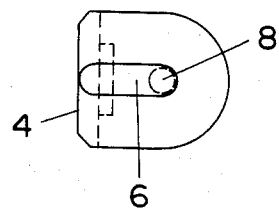
FIG. 10 is a side view of the cover showing another embodiment relative to the protuberance provided on the side portion of the cover.

FIG. 10 shows another embodiment relative to the protuberance. As seen in the side view of the cover 4, the protuberance 6 is formed oblong in the main plane direction of the cassette, with its rear end placed near the rotary shaft 7 and its tip extended near the front surface of the cover. If the rear end of the protuberance 6 is placed at the rear of the position of the rotary shaft 7, the interference between the protuberance of the cover opened and the disengaging means may be averted when making the unlocking by pressing its rear end.

Figure 11:
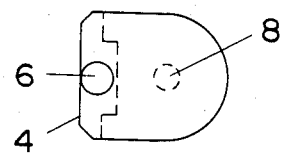
FIG. 11 is a side view of the cover showing still another embodiment relative to the protuberance.

FIG. 11 shows a circular protuberance. By making use of such a protuberance, unlocking at the closed position of the cover and its opening-closing may be performed.

Figure 12:
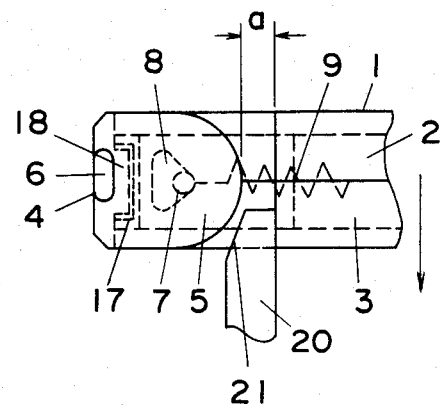
FIG. 12 is a side view of the essential part of an embodiment in which the unlocking of the cover is effected by pressing the back of the side of the cover.

FIG. 12 is a side view of the essential part of an embodiment in which the unlocking is made by pressing the rear of the side portion of the cover. A clearance is provided between the step part of the cassette body 1 and the rear edge of the side portion 5 of the cover, to insert the unlocking member into this clearance. Actually, it is inserted while the cassette being inserted into the equipment is moving in the direction of the arrow. Numeral 20 designates the unlocking member; and 21, its bevel portion. The cover 4 may be readily opened by pushing up the bottom edge of the cover 4 or by pushing up the protuberance 6 after the cover 4 thus has been brought into its unlocked state by moving it forward.

Figure 13:
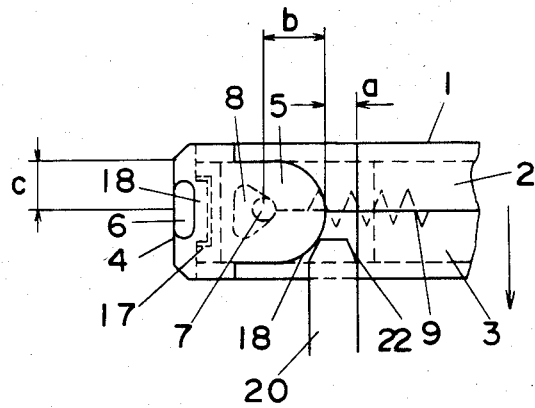
FIG. 13 is a side view of the essential part of an embodiment relative to the configuration of the side of the cover.

FIG. 13 shows an embodiment in which the width in the vertical direction of the side portion 5 of the cover is made narrow, so that not only the abutting relationship with the side portion 5 of the cover in its opened state is eliminated, but the close-fitting of the cover 4 to the cassette body is made in its opened state. Numeral 22 is a bevel portion formed toward the cassette body side.

Figure 14:
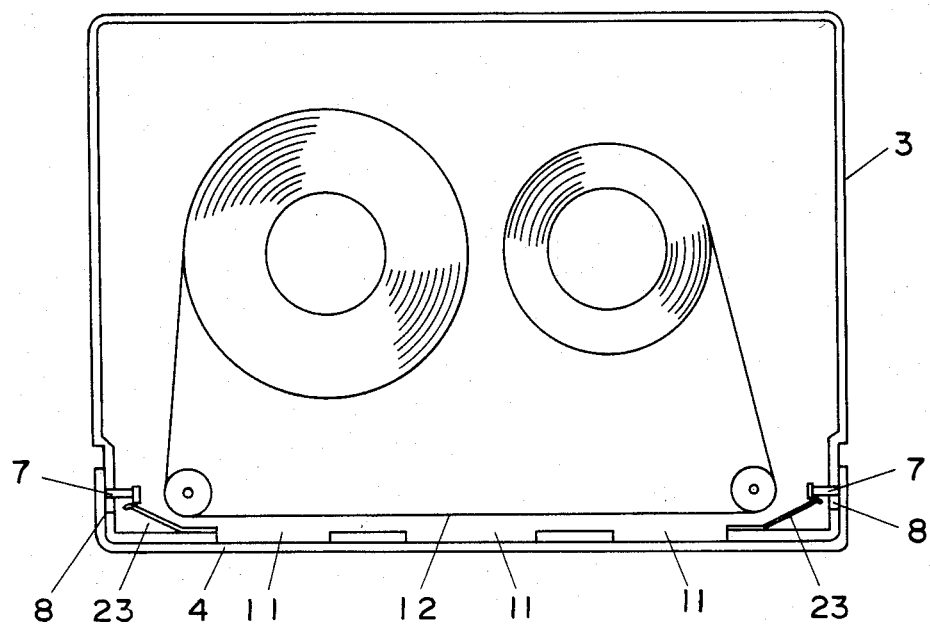
FIG. 14 is a top view showing the interior of a tape cassette in another embodiment of this invention.

FIG. 14 is a top view of a tape cassette of another embodiment of this invention, showing its interior, in which effective utilization of the internal space is intended by using leaf springs as the urging means. In this figure, 23 denotes a leaf spring held on the inside surface of the front wall of the cassette lower half 3 and by a rib or groove, etc., whose free end is always urging the rotary shaft 7 from front toward rear.

Figure 15:
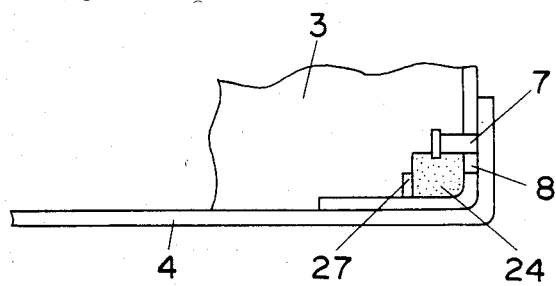
FIG. 15 is a fragmentary top view showing use of an elastic block such as rubber as the urging means.
Figure 16:
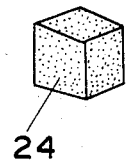
FIG. 16 is a perspective view of a rubber block.
Figure 17:
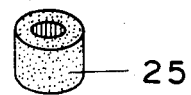
FIG. 17 is a perspective view of the elastic block formed in a pipe shape.

FIG. 15 is a fragmentary top view showing an elastic block of rubber or sponge as the urging means, 24 designating a rubber block. FIG. 16 is a perspective view of a rubber block and FIG. 17 shows a perspective view of an elastic body in a pipe shape 25. Various shapes of elastic body other than these may be contemplated. When this embodiment is adopted, it is only proper to incorporate the cover 4 while holding the elastic blocks in the specified places. Accordingly, not only is the workability improved, but the parts costs are cut down.

Figure 18:
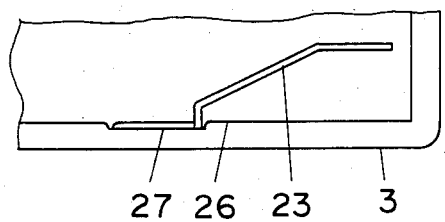
FIG. 18 is a fragmentary top view of an embodiment relative to the way of holding of the leaf spring.
Figure 19:
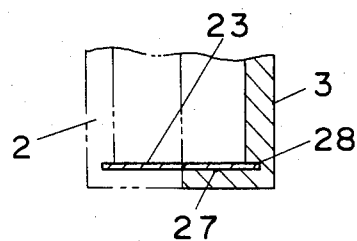
FIG. 19 is a side sectional view of the same.

FIG. 18 is a fragmentary top view of an embodiment relative to holding the leaf spring, showing the leaf spring 23 being held by the cassette lower half 3. Numeral 26 designates the inside wall of the cassette; 27, a recess for holding the leaf spring 23 provided on the side wall 26. FIG. 19 is the side sectional view, in which 28 denotes a groove extended from the recess 27 to the cassette lower half 3. The two dots and a dash lines represent the cassette upper half 2. With this structure, the leaf spring 23 may be held without affecting the internal space.

Figure 20:
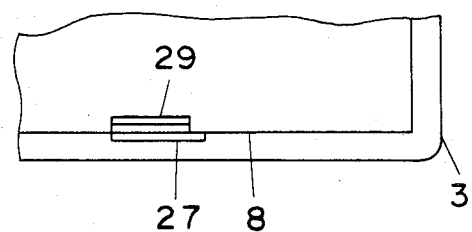
FIG. 20 is a fragmentary top view showing another embodiment of the leaf spring holding part.
Figure 21:
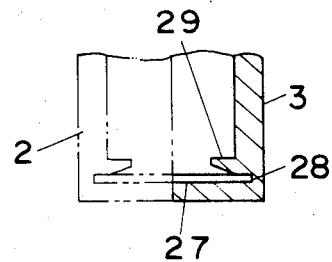
FIG. 21 is a side sectional view of the same.
Figure 22:
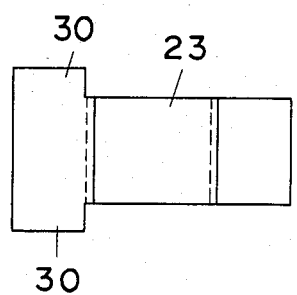
FIG. 22 is a front view of an embodiment of the leaf spring.
Figure 23:
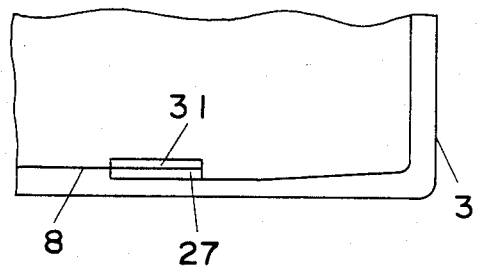
FIG. 23 is a fragmentary top view of another embodiment relative to the leaf spring holding part.
Figure 24:
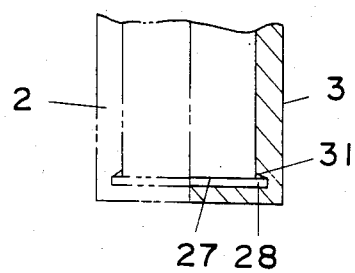
FIG. 24 is a side sectional view of the same.
Figure 25:
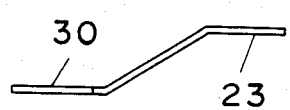
FIG. 25 is a top view of the leaf spring.
Figure 26:
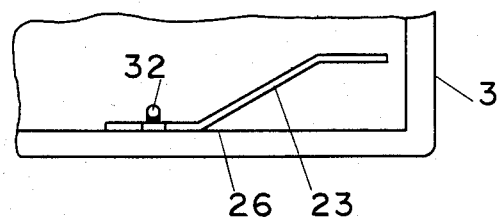
FIG. 26 is a fragmentary top view showing another embodiment relative to the way of holding the leaf spring.
Figure 27:
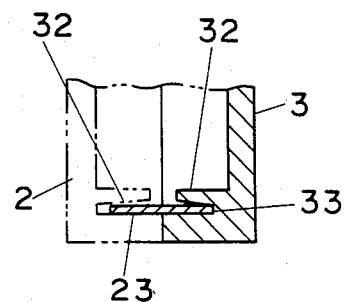
FIG. 27 is a side sectional view of the same.
Figure 28:
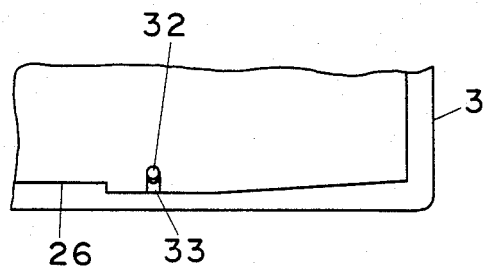
FIG. 28 is a fragmentary top view of another embodiment.
Figure 29:
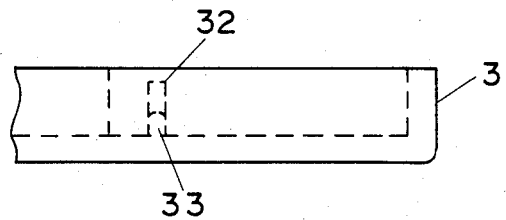
FIG. 29 is a front view of the same.
Figure 30:
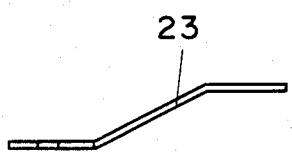
FIG. 30 is a top view of the leaf spring.
Figure 31:
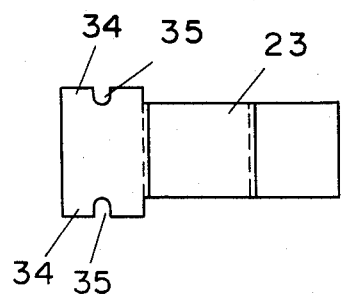
FIG. 31 is a front view of the same.
Figure 32:
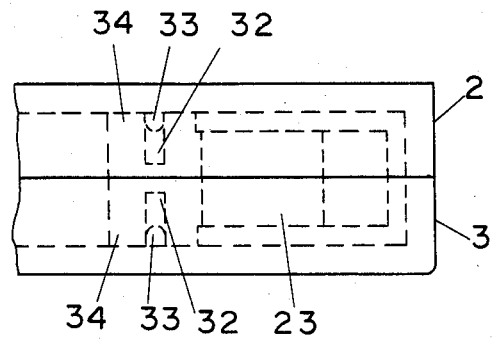
FIG. 32 is a fragmentary front view showing the assembled state of the same.

FIG. 20 is a fragmentary top view showing an embodiment having tapered ribs provided on the upper and the lower walls corresponding to the recess 27 for facilitating the holding of the leaf spring and its introduction at the time of assembling. Numeral 29 denotes the tapered rib, which not only facilitates incorporation of the leaf spring 23, but ensures its holding. FIG. 21 is its side sectional view, FIG. 22 is a front view of an embodiment of a leaf spring which is formed in the shape of T. Numeral 30 designates a projected portions which are held by the grooves, so that the movement of the leaf spring at its free end will not come in contact with the upper and the lower wall surfaces. FIG. 23 is a fragmentary top view of another embodiment relative to the holding portion in which the groove 28 is tapered, so that the same function and effect as those of the tapered rib (FIGS. 20 and 21) may be achieved. Numeral 31 stands for such tapered part. FIG. 24 is a side sectional view of the same. FIG. 25 is a top view showing the shape of the leaf spring used therefor, in which the portion bent at a right angle as shown in FIG. 16 may be eliminated by forming the inside wall part as shown in FIG. 23. FIG. 26 is a fragmentary top view showing another embodiment relative to a holding method of the leaf spring, with the leaf spring 23 being held by the cassette lower half 3. Numeral 32 designates a studded member which is studded in the lower wall of the cassette lower half 3 at a distance nearly equal the thickness of the leaf spring from the inside wall surface 26. FIG. 27 is a side sectional view of the same, the two dots and a dash alternating lines showing the state of its combination with the cassette upper half. Numeral 33 represents a rib connecting the lower portion of the inside wall 26 with the lower portion of the studded member 32. FIG. 28 depicts an embodiment in which further space-saving is designed by providing a recess in the inside wall 26, so that not only nearly the thickness of the leaf spring is accommodated therein, but a small slope is formed to gradually recover the recess toward the free end of the leaf spring to be placed there. FIG. 30 is a top view of the leaf spring; and FIG. 31, its front view. In FIG. 31, 36 is the holding portion of the leaf spring 23, which is projecting up- and down-ward, to form a T shape, and at the tips, notches 35 are formed. These notches engage with ribs 33 for prevention of shifting in the lateral direction. The positioning in the longitudinal direction is made by the inside wall surface and the studded member 32 located at a distance nearly equal the plate thickness therefrom. FIG. 32 is a fragmentary front view showing the assembled state.

As described in the foregoing, the embodiment of this invention permits holding of leaf spring on the inside wall surface of the cassette in close contact therewith and is, therefore, very effective for application in a narrow space inside the cassette. Besides, the studded member 30 may be tapered to be upwardly opening or the studded member is studded in one cassette half only, to a higher than the side wall of the cassette half, or assembling improvement may be designed by shifting its position from both upper and lower halves and extending it inside opposite halves.

What is claimed is:

1. A tape cassette comprising a cassette body having an opening part on one side thereof and a ⊐-chape cover which makes opening-closing of said opening part, and including a pair of rotary shafts for said cover provided on the sides of the ⊐-shape cover, a pair of engaging holes being in the shape of a triangle which is tapering rearward, and a urging means for urging said rotary shaft toward rear of the cassette body.

2. A tape cassette according to claim 1 characterized in that the cassette body is composed by abutting its upper and lower halves and that the engaging holes for holding the rotary shafts of the cover are formed at the part where the upper and the lower halves abut on each other.

3. A tape cassette according to claim 1 characterized in that the distance from the inside surface of the cover to the rotary shaft is set nearly ½ of the total thickness of the front of the cassette.

4. A tape cassette according to claim 1 characterized in that a protuberance for opening-closing of said cover is formed at the front of the side.

5. A tape cassette according to claim 4 characterized in that the relationship between the distance of the protuberance for opening-closing of the cover from the rotary shaft and its height m from the center is set to be l≧m.

6. A tape cassette comprising a cassette body having an opening portion on one side, and a ⊐-shape cover which makes opening-closing of said opening portion, and including a pair of rotary shafts provided on the sides of the ⊐-shape cover, a pair of engaging holes in the shape of V which is tapering rearward, with which said rotary shafts engage, and urging means for urging said rotary shafts toward rear of the cassette body.

7. A tape cassette having a cassette body having an opening part at one side, a ⊐-shape cover for making opening-closing of said opening part by turning it up- and down-ward, a pair of rotary shafts provided on the sides of the ⊐-shape cover, a pair of engaging holes in the shape of nearly a triangle which is tapering rearward, with which the rotary shafts provided on the cassette body engage, urging means for urging the rotary shafts toward the rear of the cassette body and a cover locking means composed of recesses provided in the opening surface and protrusions formed on the inside surface of the cover corresponding thereto.

8. A tape cassette according to claim 7 characterized in that a plurality of recesses are provided on the upper and the lower surfaces of the cassette body corresponding to the plurality of protursions on the inside surface of the cover in the state of being opened.

9. A tape cassette according to claim 7 characterized in that the relationship of recesses and protrusions is mutually inversed.

10. A tape cassette according to claim 7 characterized in that arbitrary portions of the opening part are recessed.

11. A tape cassette according to claim 7 characterized in that a clearance for insertion of unlocking means is provided between the rear edge of the cover part and a part of the cassette body.

12. A tape cassette according to claim 7 characterized in that the distance from the rotary shaft at the side of the cover to its rear end is made larger than that between the rotary shaft and the upper or the lower end by a distance equal to or larger than the shift required for unlocking.

13. A tape cassette according to claim 1 comprising a cassette body having an opening part on one side, a -shape cover whose opening-closing is made by turning the aforementioned opening part up- and downward, a pair of rotary shafts provided on the sides of the -shape cover, a pair of engaging holes in the shape of a triangle which is tapering rearward, provided in the cassette body to be engageable with the rotary shafts, and urging means placed forward of the aforementioned rotary shafts for urging the rotary shafts toward rear of the cassette body.

14. A tape cassette according to claim 13 characterized in that the urging means is formed of an elastic body of soft rubber or spongy material, etc.

15. A tape cassette according to claim 13 characterized in that the urging means are composed of leaf springs held on the inside of the front wall of the cassette.

16. A tape cassette according to claim 15 characterized in that the leaf spring holding part is composed of a recess provided in the inside wall and grooves formed in the upper and the lower walls of the recess.

17. A tape cassette according claim 16 characterized in that a leaf spring formed in the shape of T is held by a holding part.

18. A tape cassette according to claim 15 characterized in that the leaf spring holding part is composed of a recess provided in the inside wall surface and tapered ribs studded in the upper and the lower wall surfaces and facing the recess.

19. A tape cassette according to claim 18 characterized in that a leaf spring formed in the shape of T is held by a holding part.

20. A tape cassette according to claim 15 equipped with leaf spring holding parts comprising the inside wall surface, studded members which are studded in the upper and the lower wall surfaces and distanced from the inside wall surface, and a rib placed between the aforementioned inside wall surface and the studded members.

21. A tape cassette according to claim 20 characterized in that a T shaped leaf spring having T shape projections which are notched is held in each holding part.

* * * * *